(12) United States Patent
Morie et al.

(10) Patent No.: US 7,587,010 B2
(45) Date of Patent: Sep. 8, 2009

(54) COMPLEX FILTER CIRCUIT AND RECEIVER CIRCUIT

(75) Inventors: Takashi Morie, Osaka (JP); Hiroya Ueno, Osaka (JP); Hirokuni Fujiyama, Hyogo (JP); Joji Hayashi, Osaka (JP); Akinori Matsumoto, Osaka (JP); Katsumasa Hijikata, Osaka (JP)

(73) Assignee: Panasonic Corporation, Osaka (JP)

( * ) Notice: Subject to any disclaimer, the term of this patent is extended or adjusted under 35 U.S.C. 154(b) by 643 days.

(21) Appl. No.: 11/247,136

(22) Filed: Oct. 12, 2005

(65) Prior Publication Data

US 2006/0088136 A1    Apr. 27, 2006

(30) Foreign Application Priority Data

Oct. 27, 2004  (JP)  ............................ 2004-311842
Aug. 19, 2005  (JP)  ............................ 2005-238422

(51) Int. Cl.
*H04B 1/10* (2006.01)

(52) U.S. Cl. ................... 375/350; 375/346; 375/347; 375/322; 375/352; 455/213; 455/323; 455/427; 327/552; 327/555

(58) Field of Classification Search ................ 375/316, 375/322, 346, 347, 350, 130, 135–137, 146, 375/260, 265–266, 355; 455/213, 323, 313, 455/293, 427, 456; 327/552, 555, 557
See application file for complete search history.

(56) References Cited

U.S. PATENT DOCUMENTS

| 6,278,870 | B1 | 8/2001 | Davie et al. |
| 7,012,487 | B2* | 3/2006 | Allott ..................... 333/214 |
| 7,098,731 | B1* | 8/2006 | Wyszynski ................ 327/557 |
| 2003/0072393 | A1 | 4/2003 | Gu |
| 2004/0053590 | A1* | 3/2004 | Marholev ................... 455/213 |
| 2004/0072575 | A1* | 4/2004 | Young et al. ............. 455/456.1 |
| 2004/0184562 | A1* | 9/2004 | Wang et al. ................ 375/322 |
| 2007/0008030 | A1* | 1/2007 | Kasperkovitz ............. 327/552 |

(Continued)

FOREIGN PATENT DOCUMENTS

JP        2001-045080          2/2001

(Continued)

OTHER PUBLICATIONS

Shahrzad Tadjpour, et al., "A 900MHz Dual Conversion Low-IF GSM Receiver in 0.35 µm CMOS," 2001, Paper 18.5, IEEE, International Solid-State Circuits Conference, Session 18.

(Continued)

*Primary Examiner*—Shuwang Liu
*Assistant Examiner*—Hirdepal Singh
(74) *Attorney, Agent, or Firm*—McDermott Will & Emery LLP

(57) ABSTRACT

A pseudo-image signal producing section produces a pseudo-image signal imitating an actual image signal. An amplitude detection section detects the amplitude of the pseudo-image signal having passed through a complex filter circuit. A filter control section controls an element value control section in the complex filter circuit so as to decrease the detected amplitude. The element value control section performs an element value adjustment so that absolute element values of a pair of elements corresponding to each other in two filter circuits in the complex filter circuit increase/decrease in opposite directions.

18 Claims, 14 Drawing Sheets

U.S. PATENT DOCUMENTS

2007/0053472 A1*  3/2007  Feher .......................... 375/347
2008/0139160 A1*  6/2008  Tan et al. .................... 455/323

FOREIGN PATENT DOCUMENTS

| JP | 2001-506108 | 5/2001 |
|---|---|---|
| JP | 2003-324364 | 11/2003 |
| WO | WO 03/103135 A1 | 12/2003 |

OTHER PUBLICATIONS

Japanese Notice of Reasons for Rejection, with English Translation, issued in Japanese Patent Application No. JP 2005-238422, mailed on Mar. 4, 2008.

* cited by examiner

COMPLEX FILTER CIRCUIT AND RECEIVER CIRCUIT

CROSS REFERENCE TO RELATED APPLICATION

This application claims priority under 35 U.S.C. §119 on Patent Application No. 2004-311842 filed in Japan on Oct. 27, 2004 and Patent Application No. 2005-238422 filed in Japan on Aug. 19, 2005, the entire contents of which are hereby incorporated by reference.

BACKGROUND OF THE INVENTION

The present invention relates to a wireless communications system, and more particularly to a complex filter and a receiver circuit having the same.

Typically, in a wireless communications receiver system of a superheterodyne architecture, such as a low-IF architecture, a complex filter circuit is used for removing an image signal. FIG. 14 shows a configuration of a conventional low-IF type receiver circuit. An LNA (Low Noise Amplifier) 10 amplifies a quadrature-modulated signal received via an antenna (not shown), or the like. A quadrature demodulator 20 performs quadrature modulation while downconverting the received signal, which has been amplified by the LNA 10, to a medium frequency, thus producing an I signal and a Q signal having phases shifted from each other by 90 degrees. VGAs (Variable Gain Amplifiers) 30a and 30b amplify the I signal and the Q signal, respectively. A complex filter circuit 40A receives the I signal and the Q signal, which have been amplified by the VGAs 30a and 30b, respectively, and performs an image rejection operation on these signals. A signal processing section 50 having an A/D conversion function digitally converts the signals, which have passed through the complex filter circuit 40A, and performs various operations based on the digitally converted data.

An input to the complex filter circuit 40A, i.e., an output from the quadrature demodulator 20, in principle contains not only an intended signal but also contains, as a noise component, an image signal being a frequency component of the opposite sign to that of the intended signal. The complex filter circuit 40A passes an intended signal therethrough, thus functioning to reduce the image signal. Therefore, ideal transmission characteristics of a complex filter circuit are typically such that the gain is high for the frequency band of an intended signal and low for that of an image signal. The gain difference therebetween is called an "image rejection ratio". A complex filter circuit is required to maintain a high image rejection ratio.

In the future, further reductions in the power consumption and size will be required for wireless communications systems. In order to reduce the power consumption and the circuit area of a complex filter circuit, it is effective to form the complex filter circuit as a Gm-C filter including a transconductor and a capacitor while setting the transconductance (gm) and the capacitance value (C) both to low values. However, setting these element values to small values increases an IQ mismatch, which is a mismatch between an element in the I signal processing portion of the complex filter circuit and the corresponding element in the Q signal processing portion thereof, thus degrading the image rejection ratio of the complex filter circuit.

FIG. 15 is a graph showing the transmission characteristics of complex filter circuits. As compared with ideal characteristics, the transmission characteristics of a complex filter circuit with an IQ mismatch significantly vary just over the frequency band of the image signal. Since the influence of the IQ mismatch is significant over the image frequency band, even a very slight error in an element may lead to a significant degradation of the image rejection ratio. Therefore, when one attempts to reduce the power consumption and the circuit area of a complex filter circuit, it is necessary to reduce the IQ mismatch in one way or another.

Conventional methods for reducing the IQ mismatch are based on the phase error in a local oscillator signal input to a quadrature demodulator. Specifically, the conventional methods aim at reducing the phase error in the local oscillator signal input to the quadrature demodulator because a phase error of the local oscillator signal leads to a phase error of the I and Q signals. With these conventional methods, however, it is essentially difficult to compensate for the gain error in the complex filter circuit.

Moreover, it is expected that pursuing further reductions in the power consumption and the circuit area of a complex filter circuit will result in the characteristics degradation due to an element error being more serious than that due to the phase error of the local oscillator signal. Therefore, it is necessary to establish a method for reducing the IQ mismatch based on the element error in the complex filter circuit.

SUMMARY OF THE INVENTION

In view of the problems set forth above, it is an object of the present invention to reduce an IQ mismatch, thereby improving an image rejection ratio, in a complex filter circuit and in a quadrature-modulated signal receiver circuit using the same.

In order to achieve the object set forth above, the present invention provides a complex filter circuit, including first and second filter circuits receiving first and second signals, respectively, which are in a quadrature-phase relationship with each other, wherein: the first and second filter circuits each include at least one variable element whose element value can be varied; and the complex filter circuit includes an element value control section for changing the element value of a variable element in the first filter circuit and the element value of a corresponding variable element in the second filter circuit so that absolute values of the element values of the variable elements increase/decrease in opposite directions.

The present invention also provides a complex filter circuit, including first and second filter circuits receiving first and second signals, respectively, which are in a quadrature-phase relationship with each other, wherein: one of the first and second filter circuits includes at least one variable element whose element value can be varied; and the complex filter circuit includes an element value control section for changing the element value of the variable element in one of the first and second filter circuits.

The present invention also provides a quadrature-modulated signal receiver circuit, including: a quadrature demodulator for quadrature-demodulating a received signal; the complex filter circuit set forth above receiving signals quadrature-demodulated by the quadrature demodulator, which are in a quadrature-phase relationship with each other; a signal switch for selectively inputting to the receiver circuit one of an actual signal and a pseudo-image signal imitating an image signal contained in the actual signal; an amplitude detection section for detecting an amplitude of a signal having passed through the complex filter circuit; and a filter control section for controlling the element value control section in the complex filter circuit based on the amplitude detected by the amplitude detection section. The filter control section controls the element value control section with the pseudo-image signal being input to the receiver circuit via the signal switch so as to decrease the amplitude detected by the amplitude detection section.

The present invention also provides a quadrature-modulated signal receiver circuit, including: a quadrature demodulator for quadrature-demodulating a received signal; first and second phase adjustment circuits for adjusting phases of first and second signals output from the quadrature demodulator, which are in a quadrature-phase relationship with each other; the complex filter circuit set forth above receiving the first and second signals; an amplitude detection section for detecting an amplitude of a signal having passed through the complex filter circuit; a filter control section for controlling the element value control section in the complex filter circuit based on the amplitude detected by the amplitude detection section; and a phase adjustment control section for controlling the first and second phase adjustment circuits based on the amplitude detected by the amplitude detection section. The filter control section controls the element value control section so as to decrease the amplitude detected by the amplitude detection section. The phase adjustment control section controls the first and second phase adjustment circuits so as to decrease the amplitude detected by the amplitude detection section.

DESCRIPTION OF THE PREFERRED EMBODIMENTS

Preferred embodiments of the present invention will now be described with reference to the drawings.

First Embodiment

Figure 1:
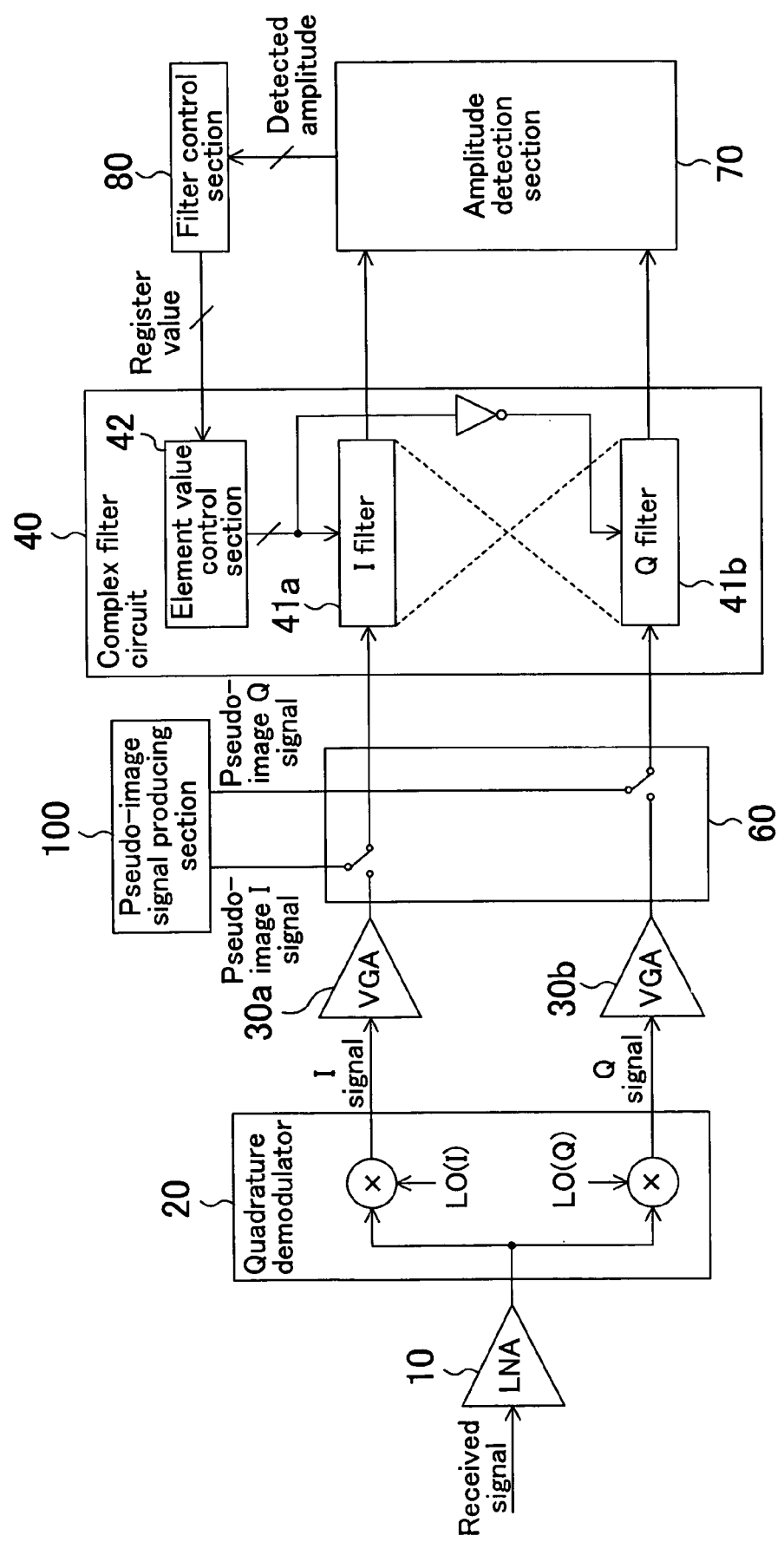
FIG. 1 shows a configuration of a receiver circuit according to a first embodiment of the present invention.
Figure 14:
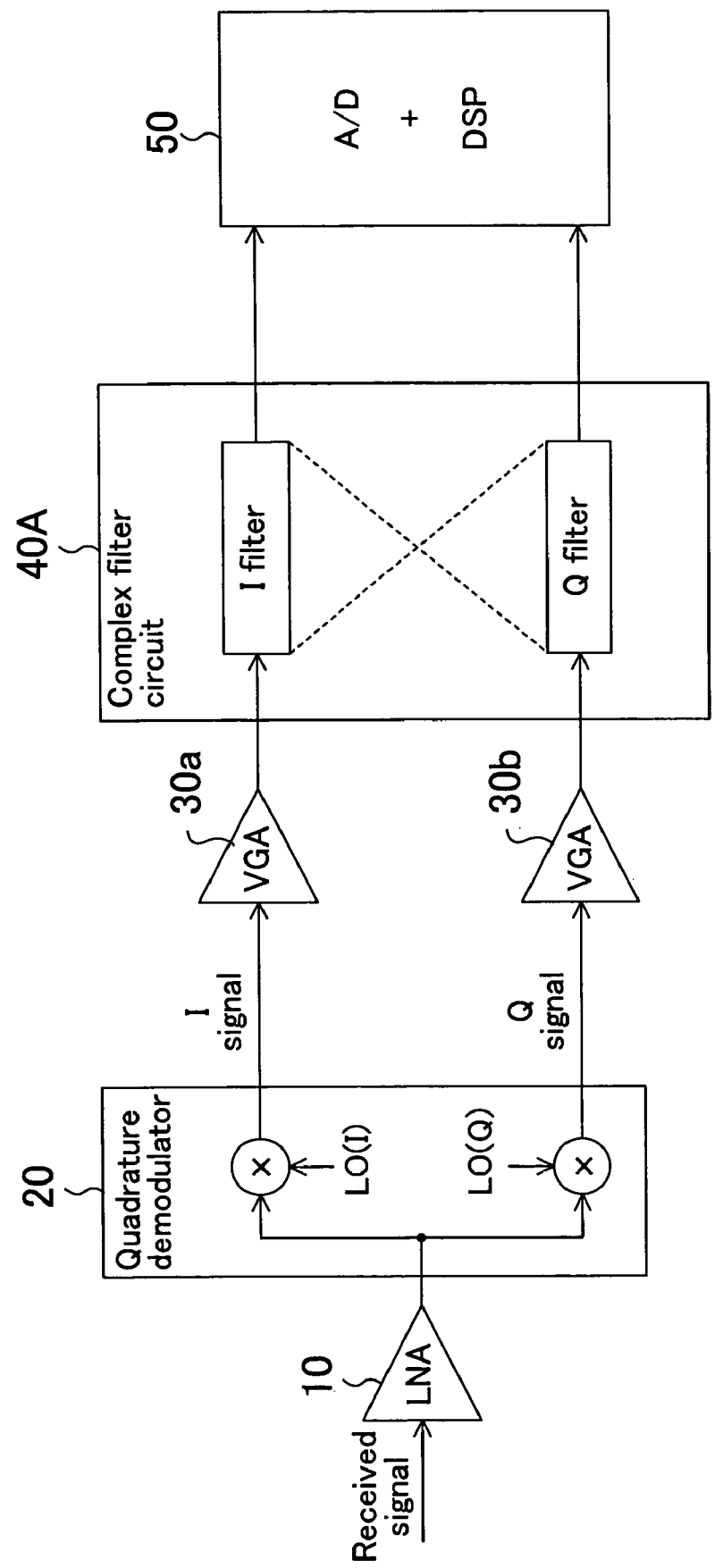
FIG. 14 shows a configuration of a conventional receiver circuit of a low-IF architecture.
Figure 15:
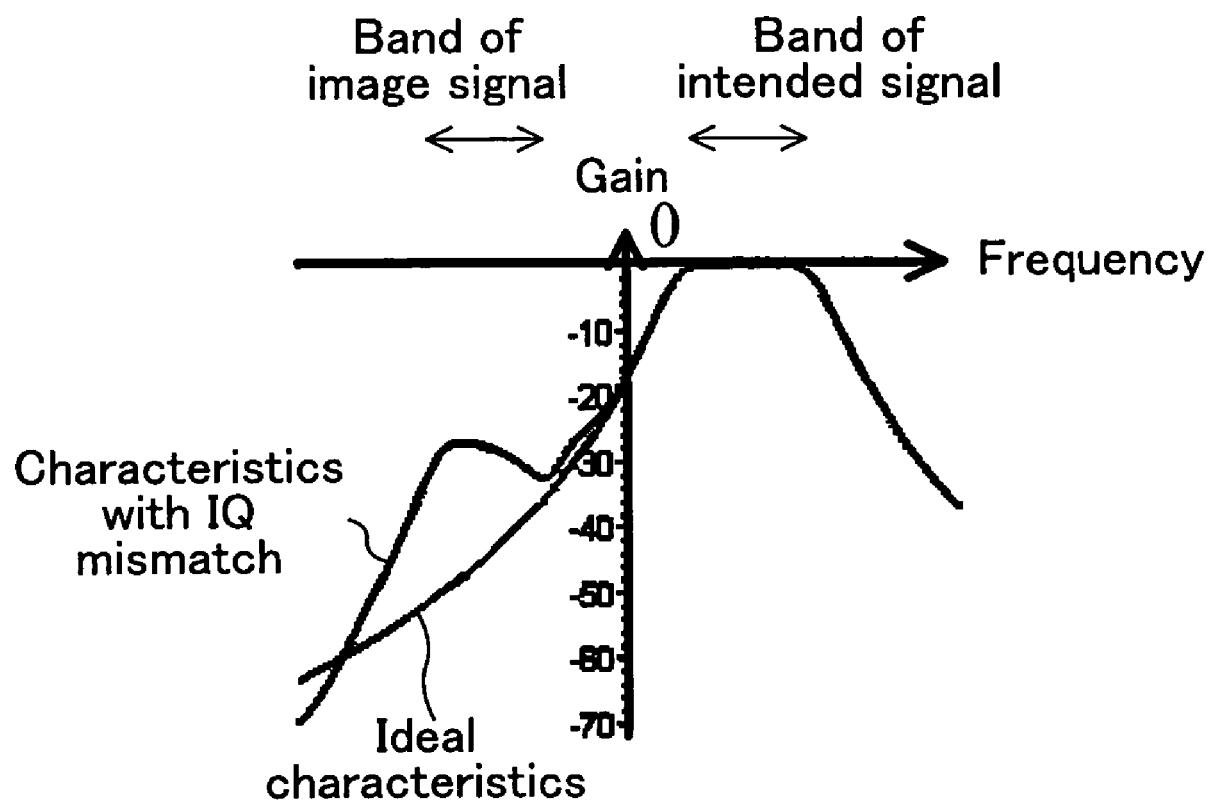
FIG. 15 is a graph showing the transmission characteristics of complex filter circuits.

FIG. 1 shows a configuration of a receiver circuit according to a first embodiment of the present invention. The receiver circuit of the present embodiment includes an LNA 10, a quadrature demodulator 20, VGAs 30a and 30b, a complex filter circuit 40, a signal switch 60, an amplitude detection section 70, a filter control section 80, and a pseudo-image signal producing section 100. Elements characteristic of the present invention will now be described in detail. Note that like elements to those of the conventional receiver circuit shown in FIG. 14 will be denoted by like reference numerals and will not be further described below.

Figure 2:
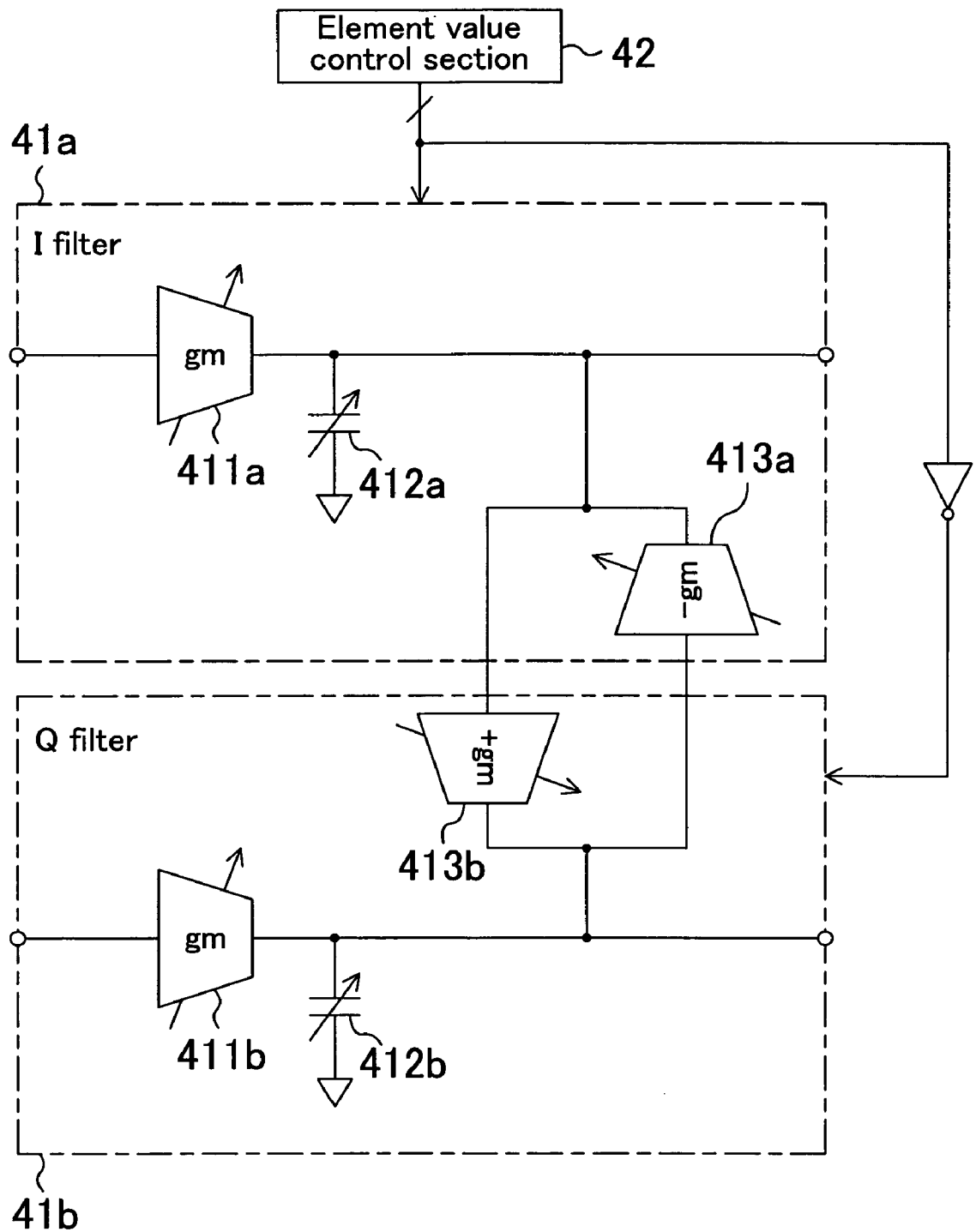
FIG. 2 shows a configuration of a complex filter circuit.

FIG. 2 shows a configuration of the complex filter circuit 40. The complex filter circuit 40 of the present embodiment generally includes a filter circuit 41a for processing an I signal, a filter circuit 41b for processing a Q signal, and an element value control section 42. The complex filter circuit 40 employs a Gm-C filter configuration, placing a high priority on the reduction of the power consumption. Specifically, the filter circuit 41a includes a transconductor 411a receiving an I signal, a capacitor 412a one end of which is connected to the transconductor 411a, and a transconductor 413a connected on the output side of the transconductor 411a and receiving a signal output from the filter circuit 41b. The filter circuit 41b includes a transconductor 411b receiving a Q signal, a capacitor 412b one end of which is connected to the transconductor 411b, a transconductor 413b connected to the output side of the transconductor 411b and receiving a signal output from the filter circuit 41a. The filter circuits 41a and 41b have substantially the same configuration except that the element values, i.e., the transconductances (hereinafter referred to simply as "gm"), of the transconductors 413a and 413b are of opposite signs.

Note that the configuration of the complex filter circuit 40 is not limited to this. For example, the complex filter circuit 40 may include a plurality of sets of the filter circuits 41a and 41b connected to one another. As long as a Gm-C filter configuration is employed, it is assumed that the complex filter circuit 40 includes a transconductor (the transconductors 411a and 411b in the present embodiment) and a capacitor (the capacitors 412a and 412b in the present embodiment) in each of the I signal processing portion and the Q signal processing portion, and includes a pair of transconductors (the transconductors 413a and 413b in the present embodiment) cross-connected between the I signal processing portion and the Q signal processing portion.

An IQ mismatch in the complex filter circuit 40 as used herein refers to the absolute element value of an element in the filter circuit 41a being different from that of the corresponding element in the filter circuit 41b. For example, there is an IQ mismatch if the transconductors 411a and 411b have different absolute gm values, if the capacitors 412a and 412b have different absolute capacitance values (hereinafter the capacitance value will be referred to simply as "C"), or if the transconductors 413a and 413b have different absolute gm values. As described above, the IQ mismatch results in a degradation of the image rejection ratio of the complex filter circuit 40.

The element value control section 42 adjusts the element value of each element in the complex filter circuit 40. A filter is typically required to have an element value adjustment function for suppressing filter band variations due to element value variations. The element value control section 42 has an element value adjustment function for adjusting the filter band, and adjusts the element values of each pair of elements corresponding to each other in the filter circuits 41a and 41b so that the absolute element values thereof increase/decrease in the same direction. On the other hand, in order to reduce the IQ mismatch, it is necessary to adjust the element values of each pair of elements corresponding to each other in the I signal processing portion and the Q signal processing portion so that the absolute element values thereof increase/decrease in opposite directions. The element value control section 42 also has an element value adjustment function for reducing the IQ mismatch, and adjusts the element values of each pair of elements corresponding to each other in the filter circuits 41a and 41b so as to bring the absolute element values thereof closer to each other. Thus, the element value control section 42 performs element value adjustment operations in opposite directions for the filter circuits 41a and 41b. As the element value control section 42 has the two different element value adjustment functions, the complex filter circuit 40 can realize both a precise filter band and a high image rejection ratio.

Figure 3:
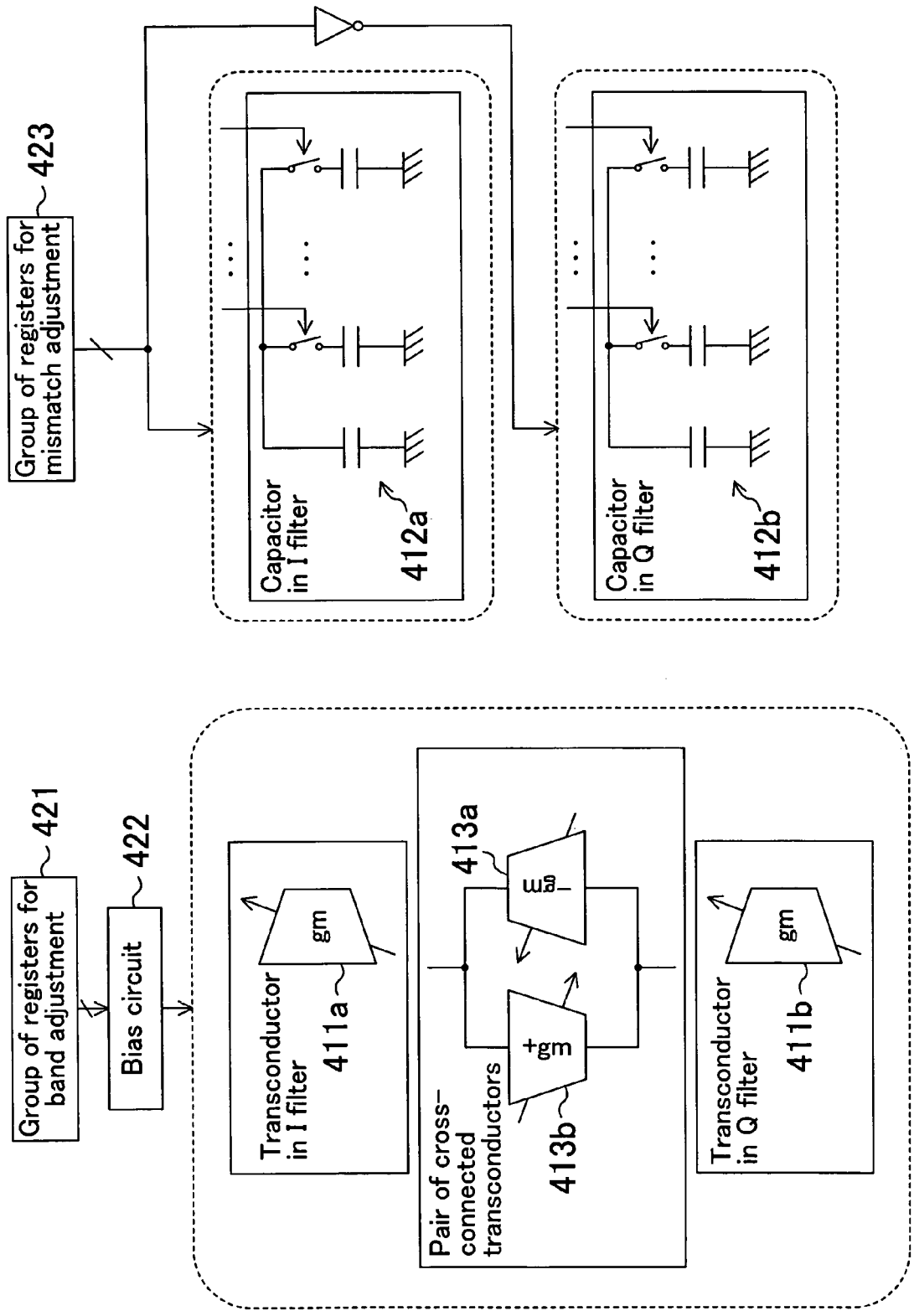
FIG. 3 shows a configuration of an element value control section.

FIG. 3 shows a configuration of the element value control section 42. The element value control section 42 includes a group of registers 421 and a bias circuit 422 for adjusting the filter band, and a group of registers 423 for reducing the IQ mismatch. The output signal from the bias circuit 422 changes according to the value set in the group of registers 421. Thus, the transconductor 411a in the filter circuit 41a, the transconductor 411b in the filter circuit 41b, and the cross-connected transconductors 413a and 413b are controlled so that the absolute gm values thereof increase/decrease in the same direction. Needless to say, these elements are preferably controlled in such a manner that the gm values increase/decrease at a constant rate so as not to deform the shape of the filter transmission characteristics.

On the other hand, element value adjustment operations in opposite directions are performed for the C values of the capacitor 412a in the filter circuit 41a and the capacitor 412b in the filter circuit 41b according to the value set in the group of registers 423. Specifically, while the C value of the capacitor 412a is increased (or decreased), that of the capacitor 412b is decreased (or increased). As an exemplary element value adjustment method, each of the capacitors 412a and 412b may include a plurality of capacitors each of which can be connected/disconnected via a separate switch, as shown in FIG. 3, wherein the switches are controlled according to the value set in the group of registers 423, thereby digitally controlling the C values of the capacitors 412a and 412b. The filter circuits 41a and 41b are controlled with opposite logics to each other. Thus, when the switch of a capacitor element in the capacitor 412a is turned ON, the switch of the corresponding capacitor element in the capacitor 412b is turned OFF, thereby controlling the C values of the capacitors 412a and 412b in opposite directions.

Figure 4:
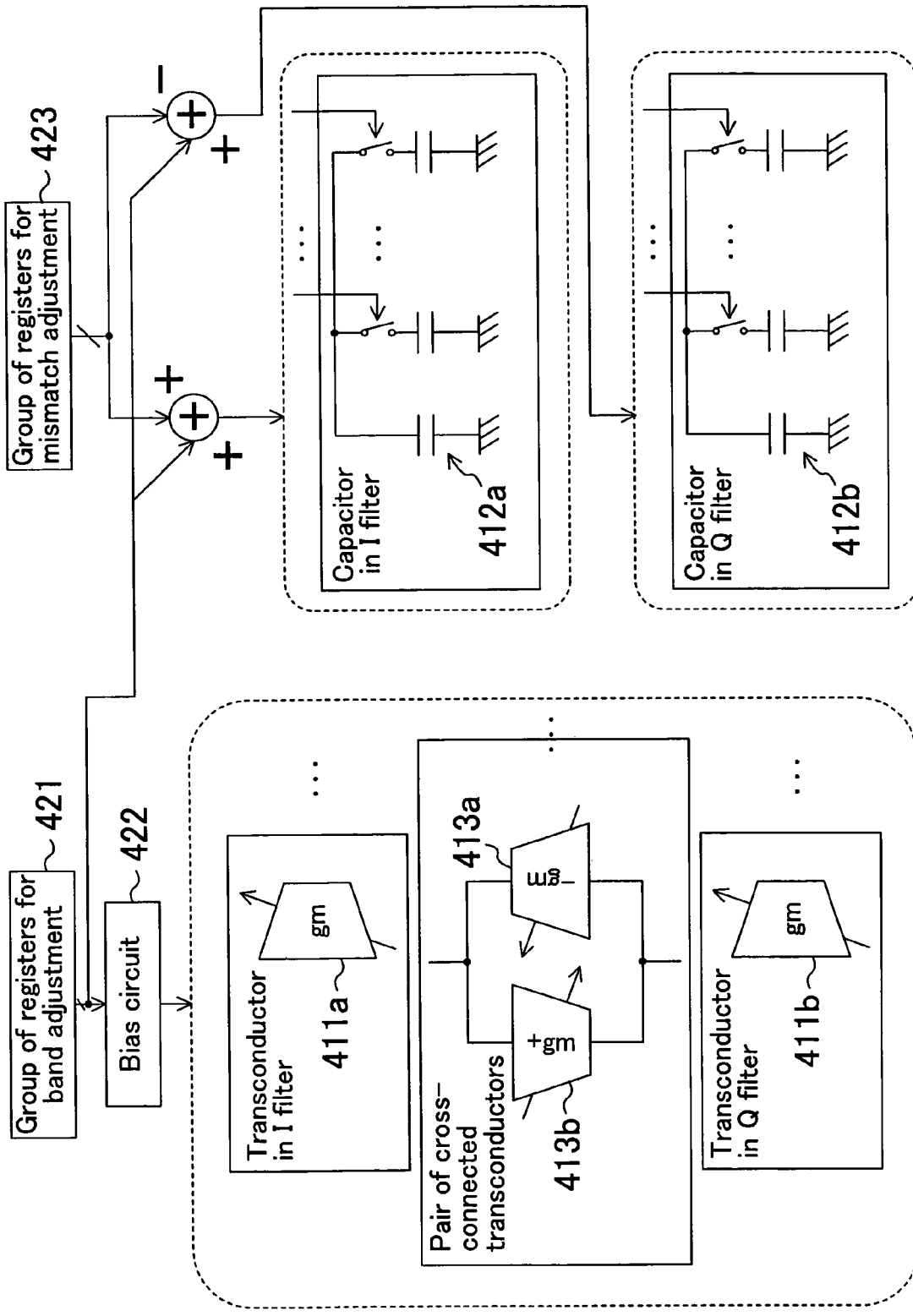
FIG. 4 shows a configuration of an element value control section.

FIG. 4 shows another configuration of the element value control section 42. With this configuration, the capacitance values of the capacitors 412a and 412b in the filter circuit 41a are also controlled according to the value set in the group of registers 421. Specifically, the filter band is adjusted by controlling the element values of the transconductors and the capacitors in the complex filter circuit 40. With the configuration of FIG. 3, the filter band adjustment is performed only by the gm adjustment, whereby the filter band adjustment may become difficult if, for example, the gm values of transconductors do not have sufficiently wide variable ranges due to the configuration of the transconductors. In contrast, with the configuration shown in FIG. 4, the filter band adjustment is performed both by the gm adjustment and by the C adjustment, thereby enabling a filter band adjustment over a wider range.

Note that the filter band adjustment may be performed only by adjusting the element values of the capacitors 412a and 412b. Moreover, the IQ mismatch adjustment may be performed by the gm adjustment, or by both the gm adjustment and the C adjustment. Thus, it is possible to perform the IQ mismatch adjustment by performing the element value adjustment only for at least one of the pair of transconductors 411a and 411b, the pair of capacitors 412a and 412b and the pair of transconductors 413a and 413b. As the number of elements to be adjusted decreases, the configuration of the complex filter circuit 40 becomes simpler. Since the first two pairs of the three have a greater influence on the image rejection performance, it is preferred that the element value adjustment is performed at least for one of these two pairs. Since the element values need to be changed in very small steps when the IQ mismatch adjustment is performed, it is more preferred that the capacitors 412a and 412b, which can be adjusted with higher precisions, are selected as elements to be adjusted for reducing the IQ mismatch.

Moreover, it is preferred that the bias circuit 422 is provided with a voltage characteristics compensation circuit and/or a temperature characteristics compensation circuit so as to prevent the degradation of the filter band and the image rejection ratio due to voltage changes and/or temperature changes after the element value adjustment. Particularly, with a Gm-C filter, in which transconductors have greater voltage changes and temperature changes, the provision of these compensation circuit is effective, whereby it is possible to maintain a high performance even after the element value adjustment.

The pseudo-image signal producing section 100 will now be described. The pseudo-image signal producing section 100 produces a pseudo-image signal imitating an actual quadrature-demodulated image signal. A pseudo-image signal as used herein refers collectively to a pseudo-image I signal primarily of a frequency component f1 and a pseudo-image Q signal whose phase is led from that of the pseudo-image I signal by 90 degrees. Specifically, the pseudo-image signal producing section 100 produces a pseudo-image I signal and a pseudo-image Q signal corresponding to the image I signal and the image Q signal, respectively.

Herein, the signal that is intended to be actually extracted by the complex filter circuit 40 is:

"intended signal" (a signal of a band including the frequency f1)

Then, the signals input to the complex filter circuit 40 and the filter circuits 41a and 41b are:

"intended I signal" (a signal of a band including the frequency f1), and

"intended Q signal" (a signal whose phase is lagged (or led) from that of the intended I signal by 90 degrees)

Then, image signals that should be rejected by the complex filter circuit 40 are:

"image I signal" (a signal of a band including the frequency f1), and

"image Q signal" (a signal whose phase is led (or lagged) from that of the intended I signal by 90 degrees)

Thus, the only difference between an intended signal and an image signal is the direction in which the phase of the Q signal is shifted with respect to that of the I signal. Note that the association between the intended/image signal and the direction in which the phase of the Q signal is shifted from that of the I signal by 90 degrees is not limited in the present invention, and is dependent on the specifications of the wireless communications system. For the purpose of discussion, it is assumed herein that an intended I signal is a signal of a band including the frequency f1, an intended Q signal is a signal whose phase is lagged from that of the intended I signal by 90 degrees, an image I signal is a signal of a band including the frequency f1, and an image Q signal is a signal whose phase is led from that of the intended I signal by 90 degrees.

Note that depending on the specifications of the wireless communications system, the above definitions of the intended signal and the image signal may be reversed.

Figure 5:
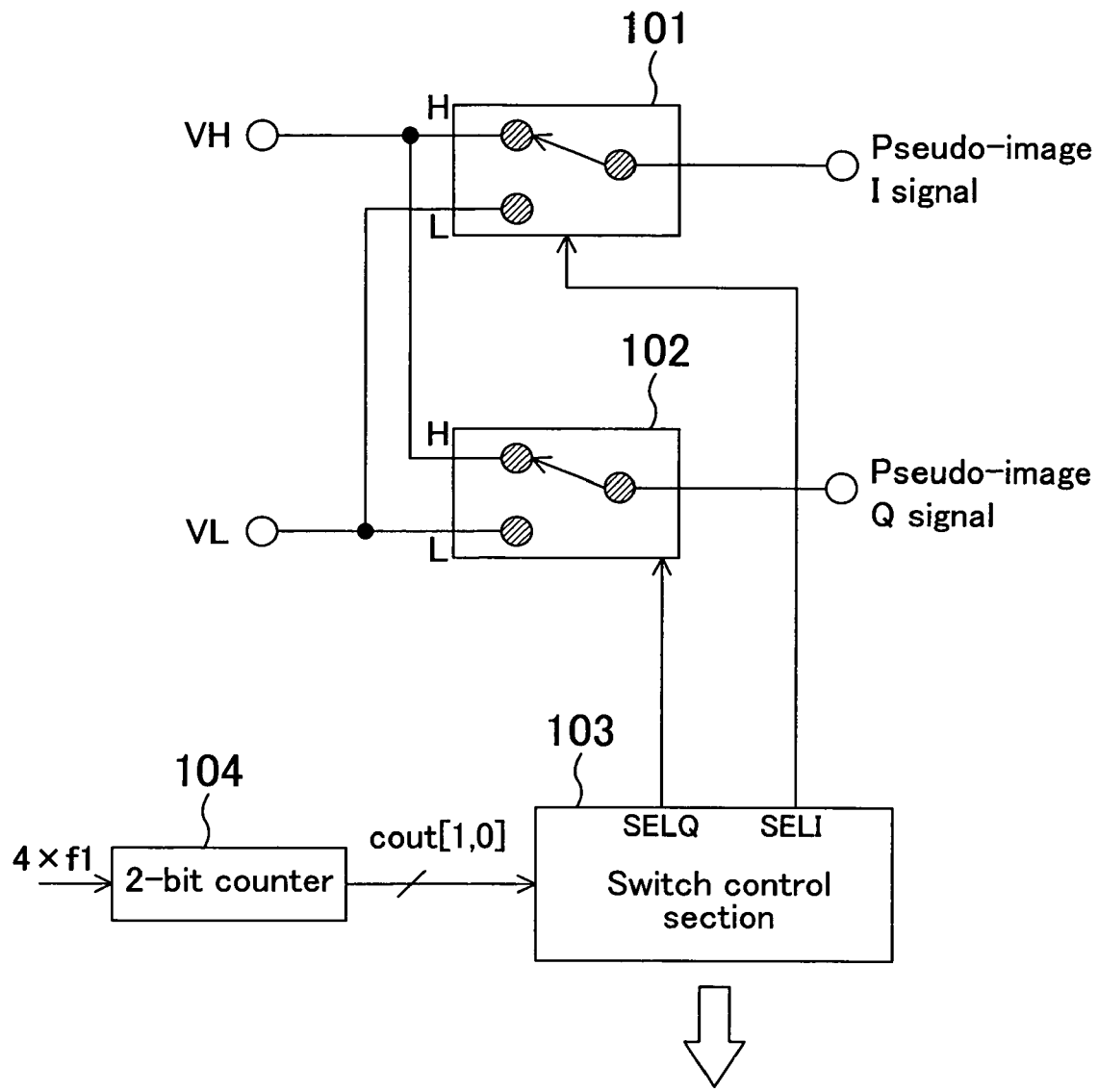
FIG. 5 shows a configuration of a pseudo-image signal producing section shown in FIG. 1.

FIG. 5 shows a configuration of the pseudo-image signal producing section 100. Selector circuits 101 and 102 each receive two voltages VH and VL respectively corresponding to the logical levels Hi and Low of the pseudo-image signal. The selector circuits 101 and 102 select one of the voltages VH and VL according to control signals SELI and SELQ output from a switch control section 103 to output the pseudo-image I signal and the pseudo-image Q signal. The selector circuit 101 outputs the voltage VH when the control signal SELI is Hi, and the voltage VL when the control signal SELI is Low. The selector circuit 102 outputs the voltage VH when the control signal SELQ is Hi, and the voltage VL when the control signal SELQ is Low. The switch control section 103 produces the control signals SELI and SELQ according to the count value "cont" of a 2-bit counter 104. Specifically, the control signals SELI and SELQ are (H,H) when cont[1,0] is "0b00", (H,L) when cont[1,0] is "0b01", (L,L) when cont[1,0] is "0b10", and (L,H) when cont[1,0] is "0b11". The 2-bit counter 104 receives a control clock signal whose frequency is four times that of the pseudo-image signal.

An advantage of the pseudo-image signal producing section 100 having a configuration as described above is that it is possible to easily produce pseudo-image signals by using the selector circuits 101 and 102 only by producing the control signals SELI and SELQ based on the control clock signal having the frequency of 4×f1 with due attention to the timing.

Figure 6:
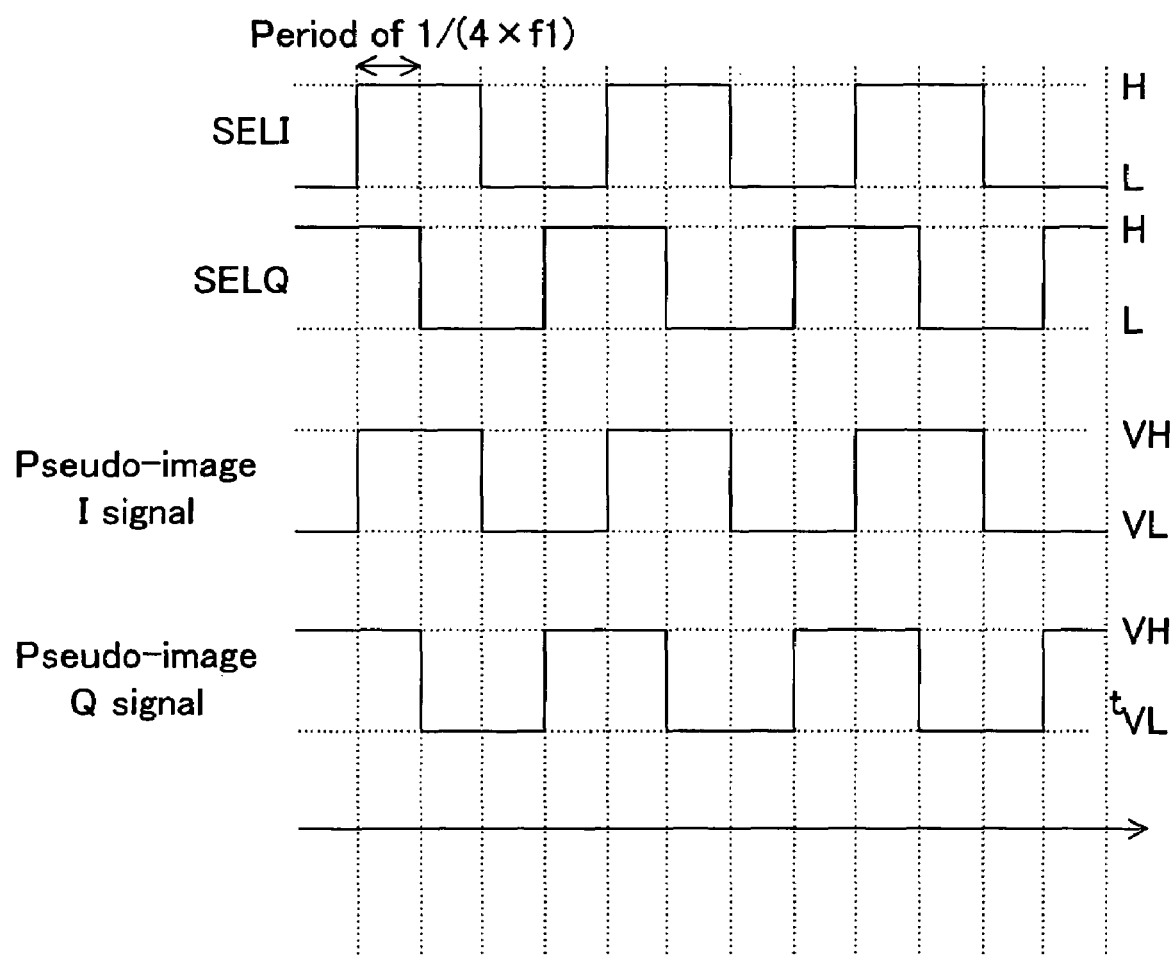
FIG. 6 is a timing diagram showing how pseudo-image signals are produced.

FIG. 6 is a timing diagram showing how pseudo-image signals are produced. As shown in FIG. 6, the logical level of each of the control signals SELI and SELQ toggles with a period equal to a half of 1/f1. Moreover, the phase of the control signal SELQ is led from that of the control signal SELI by the period of 1/(4×f1), i.e., by 90 degrees. The pseudo-image I signal and the pseudo-image Q signal are in synchronism with the control signals SELI and SELQ, respectively. Therefore, the pseudo-image Q signal has a phase led by 90 degrees from that of the pseudo-image I signal having the frequency f1.

Note that the amplitude of the pseudo-image signal is preferably as large as possible within the input dynamic range of the complex filter circuit 40. Moreover, a low-pass filter, or the like, may be inserted after the selector circuits 101 and 102 so as to remove the glitch or harmonics of the pseudo-image signal.

Figure 7:
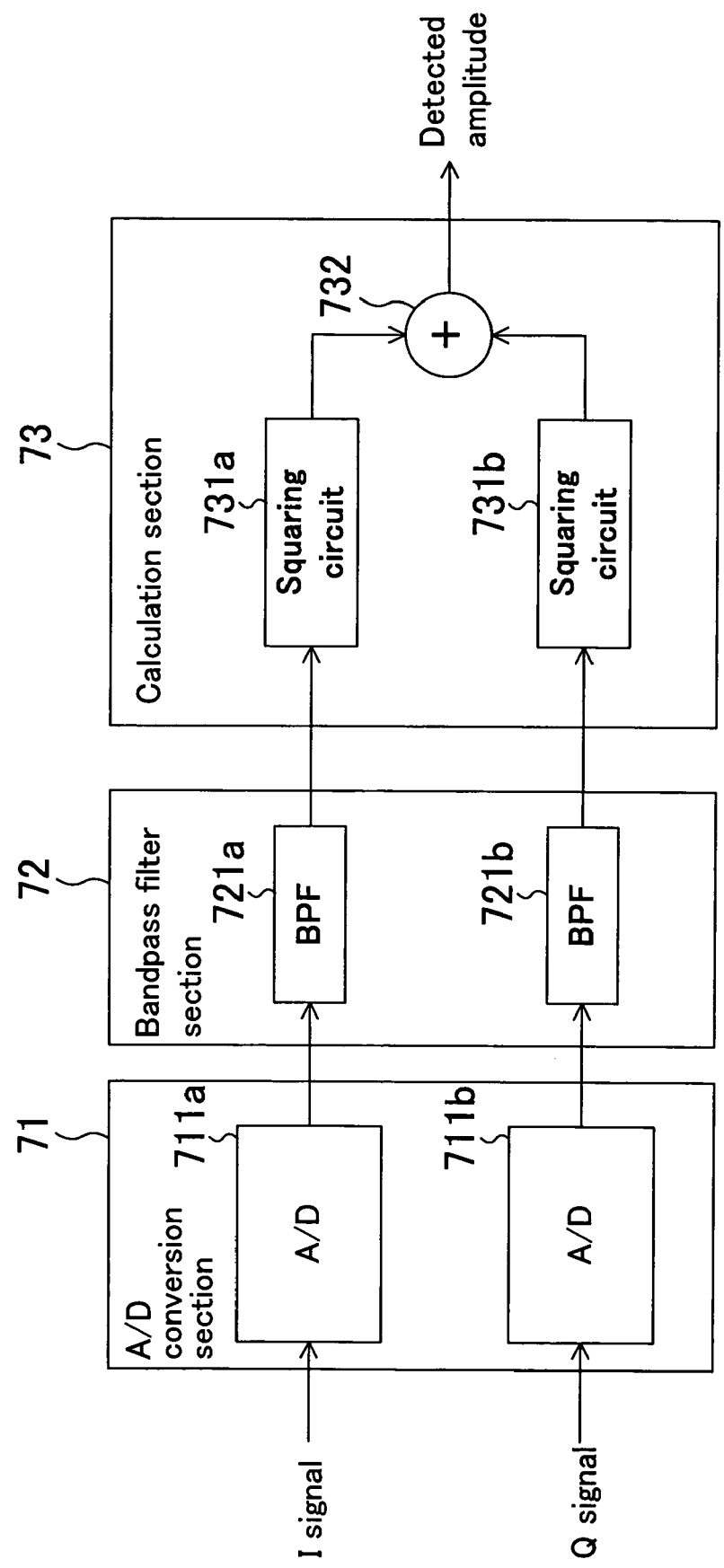
FIG. 7 shows a configuration of an amplitude detection section.

The amplitude detection section 70 will now be described. As will be described later, when a pseudo-image signal is being input to the receiver circuit of the present embodiment, the amplitude detection section 70 detects the amplitude of the pseudo-image signal. FIG. 7 shows a configuration of the amplitude detection section 70. A/D converters 711a and 711b in an A/D conversion section 71 respectively convert the I and Q signals output from the complex filter circuit 40 into digital values. Bandpass filter circuits 721a and 721b in a bandpass filter section 72 extract digital values corresponding to signal components having the frequency f1 from the A/D converters 711a and 711b, respectively. Squaring circuits 731a and 731b in a calculation section 73 respectively square the I and Q digital values extracted by the bandpass filter section 72. Then, an adder 732 in the calculation section 73 adds together the squared values from the squaring circuits 731a and 731b, and outputs the addition result as the detected amplitude.

Note that the wireless communications receiver system originally includes the A/D conversion section 71, the bandpass filter section 72 and the calculation section 73 as described above for the signal receiving operation. Since various components originally provided in the system can be used, as they are or while being partially modified, for detecting the amplitude of the pseudo-image signal, the overhead of the circuit is kept low.

Instead of detecting the amplitude from both the I and Q signals, the amplitude of either one of the signals may alternatively be detected. In such a case, there is only required one each of the A/D converter, the bandpass filter circuit and the squaring circuit, whereby it is possible to simplify the circuit.

Alternatively, without detracting from the advantageous effects of the present invention, the bandpass filter section 72 may be provided with a function of down-converting the extracted signal to a lower frequency range, or a circuit for calculating the absolute value of a given signal, for example, may be provided in the calculation section 73 instead of the squaring circuit.

Referring back to FIG. 1, the signal switch 60 selects the input to the complex filter circuit 40. Specifically, the signal switch 60 toggles between the received signals (the quadrature-demodulated I and Q signals in the present embodiment) output from the VGAs 30a and 30b, and the pseudo-image signals (the pseudo-image I signal and the pseudo-image Q signal in the present embodiment) produced by the pseudo-image signal producing section 100.

The filter control section 80 controls the complex filter circuit 40 so as to reduce the amplitude of the pseudo-image signal detected by the amplitude detection section 70. Specifically, the filter control section 80 controls the element value adjustment for the various elements in the complex filter circuit 40 by setting a value in the group of registers 423 for IQ mismatch adjustment in the element value control section 42.

An operation of the receiver circuit of the present embodiment, particularly the element value adjustment operation for the elements in the complex filter circuit 40, will now be described. First, the signal switch 60 selects the pseudo-image signal as the input to the complex filter circuit 40. Then, the amplitude detection section 70 detects the amplitude of the signal having passed through the complex filter circuit 40. The detected amplitude is given to the filter control section 80, and the filter control section 80 sets a value in the group of registers 423 in the element value control section 42. Then, based on the set value, the element values of the various elements in the complex filter circuit 40 are adjusted, thereby changing the transmission characteristics of the complex filter circuit 40. The pseudo-image signal is filtered again through the complex filter circuit 40 with the changed transmission characteristics, and the amplitude thereof is detected by the amplitude detection section 70. By repeating the operation described above, the amplitude of the pseudo-image signal having passed through the complex filter circuit 40 takes the minimum or local minimum value. Then, the signal switch 60 selects the normal received signal as the input to the complex filter circuit 40, and the received signal is filtered through the complex filter circuit 40 with adjusted element values. It is desirable that the filter band adjustment for the complex filter circuit 40 is performed before performing the element value adjustment for reducing the IQ mismatch.

As described above, according to the present embodiment, the element values of the elements in the complex filter circuit are adjusted so as to decrease the amplitude of the pseudo-image signal, and an actual received signal is filtered through the complex filter circuit whose element values have been adjusted. Thus, an actual received signal is filtered with a very high image rejection ratio. Moreover, since the complex filter circuit of the present embodiment is formed as a Gm-C filter, it is possible to realize a low power consumption and a small circuit area.

The signal switch 60 may be provided preceding the VGAs 30a and 30b instead of providing the signal switch 60 following the VGAs 30a and 30b, or in a case where other circuit elements other than the VGAs 30a and 30b are additionally provided, the signal switch 60 may be provided preceding those circuit elements. Then, it is possible to perform the element value adjustment of the complex filter circuit 40 not only in view of the IQ mismatch of the complex filter circuit 40 but also in view of that of the VGAs 30a and 30b, etc.

Alternatively, the element value adjustment may be performed for elements of only one of the filter circuits 41a and 41b in the complex filter circuit 40. In other words, the element value adjustment may be performed by controlling only one filter of the complex filter circuit 40. Even if only one filter is controlled, similar effects to those described above can be obtained as long as the element value adjustment is performed so as to decrease the amplitude of the image signal. However, it is preferred that the element value adjustment is performed for both of each pair of elements corresponding to each other, as described above, for the following reason. An IQ mismatch is an error between a pair of elements corresponding to each other. Therefore, eliminating the error by adjusting the element values of both of a pair of elements, rather than eliminating the error while fixing the element value of one of a pair of elements, results in a shorter amount of time required for the element value adjustment and a smaller range of element values over which each element needs to be adjusted, thus allowing for a lower power consumption and a smaller circuit area.

Second Embodiment

Figure 8:
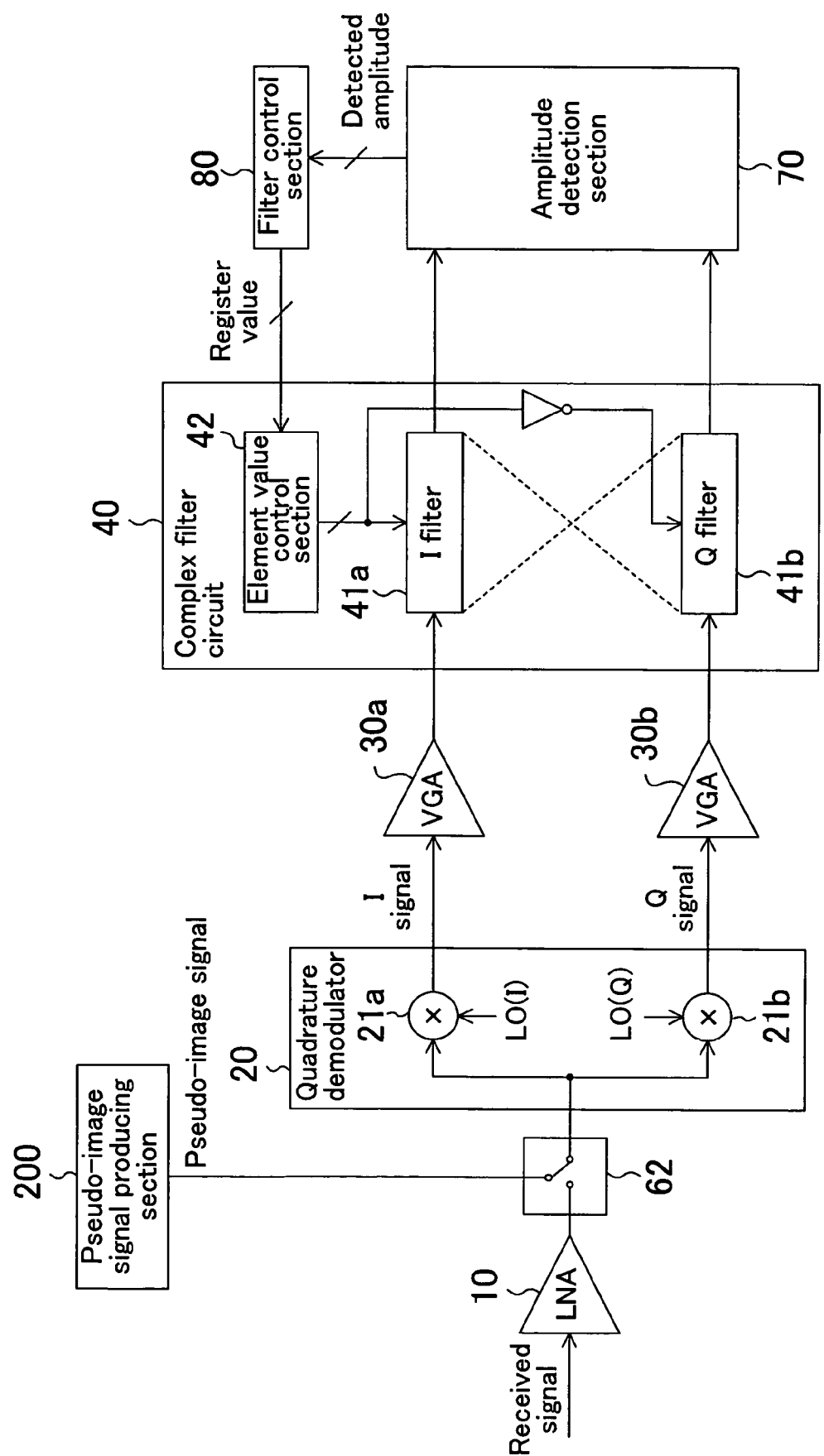
FIG. 8 shows a configuration of a receiver circuit according to a second embodiment of the present invention.

FIG. 8 shows a configuration of a receiver circuit according to a second embodiment of the present invention. The receiver circuit of the present embodiment is similar to that of the first embodiment except for how pseudo-image signals are produced and applied. Specifically, the receiver circuit of the present embodiment includes a pseudo-image signal producing section 200 and a signal switch 62. Other components are similar to those of the receiver circuit of the first embodiment. Therefore, those components and the operation of adjusting the element values of elements in the complex filter circuit 40 will not be further described below.

The quadrature demodulator 20 includes mixers 21a and 21b for performing a mixing operation on the received signals with local oscillator signals LO(I) and LO(Q) having phases shifted from each other by 90 degrees. In the receiver circuit of the present embodiment, a pseudo-image signal imitating an image signal that has not been quadrature-demodulated is applied to the quadrature demodulator 20, thereby producing a pseudo-image I signal and a pseudo-image Q signal, which are input to the complex filter circuit 40. The pseudo-image signal not having been quadrature-demodulated is produced by the pseudo-image signal producing section 200.

Assume that the frequency of the image signal not having been quadrature-demodulated is f2, and the frequency of the local oscillator signals LO(I) and LO(Q) is f3. Then, the frequency of the intended signal not having been quadrature-demodulated is expressed as 2×f3−f2. Therefore, the frequency of the quadrature-demodulated image signal is f3−f2 when f2<f3, and is f2−f3 when f2>f3. Thus, assuming that the frequency of the image signal input to the complex filter circuit 40 is f1, the relationship f1=|f3−f2| holds. The pseudo-image signal producing section 200 outputs, as the pseudo-image signal, a signal having a frequency f2 satisfying this relationship. The pseudo-image signal is converted by the quadrature demodulator 20 to a pseudo-image I signal and a pseudo-image Q signal having the intended frequency f1, and the element values of elements in the complex filter circuit 40 are adjusted with the pseudo-image I signal and the pseudo-image Q signal being input to the complex filter circuit 40. This is as described above in the first embodiment.

Although a harmonic signal having a frequency of f2+f3 is also output from the quadrature demodulator 20, it is cut off by the complex filter circuit 40, thus causing no problems, since f2+f3>>f1.

Figure 9:
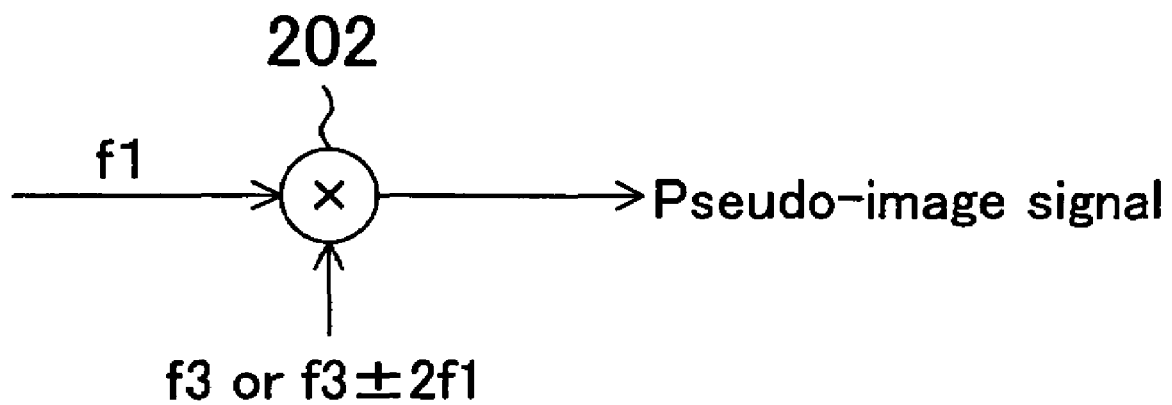
FIG. 9 shows a configuration of a pseudo-image signal producing section shown in FIG. 8.

The pseudo-image signal producing section 200 may be realized by a PLL (Phase Locked Loop) circuit, or as follows, for example. FIG. 9 shows a configuration of the pseudo-image signal producing section 200. A mixer 202 mixes a signal having a frequency f1 corresponding to a quadrature-modulated image signal with the local oscillation frequency of f3 or f3±2×f1 to output a pseudo-image signal.

Where Local Oscillation Frequency is f3

Where the local oscillation frequency of the mixer 202 is f3, the mixer 202 outputs two signals having frequencies of f3±f1. One of the two signals is a pseudo-image signal that has not been quadrature-demodulated, and the other is a signal corresponding to an intended signal that has not been quadrature-demodulated (hereinafter referred to as a "pseudo-intended signal"). Then, the output from the mixer 202 is quadrature-demodulated by the quadrature demodulator 20 to produce signals having frequencies of 2×f3±f1 and ±f1. Assuming that f3>>f1, the signals having frequencies of 2×f3±f1 are negligible as they are outside the filter band of the complex filter circuit 40. Thus, the complex filter circuit 40 substantially filters two signals, i.e., signals having frequencies of ±f1. One of the two signals is a quadrature-demodulated pseudo-image signal, and the other is a quadrature-demodulated pseudo-intended signal.

As described above, when the local oscillation frequency of the mixer 202 is f3, the complex filter circuit 40 receives not only a pseudo-image signal but also a pseudo-intended signal. Thus, the amplitude detection section 70 outputs the sum of the amplitude of the pseudo-image signal and that of the pseudo-intended signal. Since the pseudo-image signal has a higher sensitivity to the IQ mismatch of the complex filter circuit 40 than that of the pseudo-intended signal, performing the element value adjustment for the complex filter circuit 40 significantly decreases only the amplitude of the pseudo-image signal. Therefore, even if the pseudo-intended signal and the pseudo-image signal are both input to the complex filter circuit 40, the IQ mismatch can be reduced by performing the element value adjustment for the complex filter circuit 40 so as to decrease the amplitude detected by the amplitude detection section 70.

Where Local Oscillation Frequency is f3±2×f1

Where the local oscillation frequency of the mixer 202 is f3+2×f1, the mixer 202 outputs two signals having frequencies of f3+f1 and f3+3×f1. Assuming that the actual intended signal has a frequency shifted from the local oscillation frequency f3 of the quadrature demodulator 20 by f1 in the negative direction and the actual image signal has a frequency shifted from f3 by f1 in the positive direction, the mixer 202 does not output the pseudo-intended signal but outputs the pseudo-image signal not having been quadrature-demodulated. The output from the mixer 202 is quadrature-demodulated by the quadrature demodulator 20 to produce signals having frequencies of f1 and 3×f1. Since f1<<3×f1, the signal having a frequency of 3×f1 is negligible as it is outside the filter band of the complex filter circuit 40. Therefore, the complex filter circuit 40 substantially filters the signal having a frequency of f1, i.e., a quadrature-demodulated pseudo-image signal. In this case, the amplitude of the pseudo-intended signal is not added to the amplitude detected by the amplitude detection section 70. Therefore, the detected amplitude, which is varied by the element value adjustment of the complex filter circuit 40, is larger than that where the local oscillation frequency of the mixer 202 is f3, thereby facilitating an element value adjustment with a higher precision.

Also when the local oscillation frequency is f3−2×f1, the mixer 202 does not output the pseudo-intended signal but outputs the pseudo-image signal not having been quadrature-demodulated, and only the quadrature-demodulated pseudo-image signal is input to the complex filter circuit 40. Therefore, the detected amplitude, which is varied by the element value adjustment of the complex filter circuit 40, is larger than that where the local oscillation frequency of the mixer 202 is f3, thereby facilitating an element value adjustment with a higher precision.

If a PLL circuit is used as the pseudo-image signal producing section 200, the overall circuit scale will be large. In contrast, by forming the pseudo-image signal producing section 200 using the mixer 202, as shown in FIG. 9, it is possible to suppress the circuit overhead due to the addition of the IQ mismatch reducing function, and thus to reduce the cost.

Referring back to FIG. 8, the signal switch 62 selects an input to the quadrature demodulator 20. Specifically, the signal switch 62 toggles between the received signal output from the LNA 10 and the pseudo-image signal produced by the pseudo-image signal producing section 200.

As described above, according to the present embodiment, it is possible to perform the element value adjustment of the complex filter circuit 40 not only in view of the IQ mismatch of the complex filter circuit 40 and the preceding VGAs 30a and 30b, etc., but also in view of that of the quadrature demodulator 20. Thus, even the IQ mismatch of the quadrature demodulator 20 is reduced by the complex filter circuit 40 whose element values have been adjusted.

The signal switch 62 may alternatively be provided preceding the LNA 10. Thus, even the IQ mismatch occurring along the connection path from the LNA 10 to the quadrature demodulator 20 is reduced by the complex filter circuit 40.

In the first and second embodiments, it is not necessary that the pseudo-image signal producing sections 100 and 200 are provided as a portion of the receiver circuit. Alternatively, without detracting from the advantageous effects of the present invention, the pseudo-image signal producing sections 100 and 200 may be provided outside the receiver circuit to input pseudo-image signals to the receiver circuit from outside.

While the present invention has been described above with respect to the complex filter circuit 40 employing a Gm-C filter configuration, which is believed to be most influenced by an IQ mismatch, it is similarly possible to reduce the IQ mismatch and improve the image rejection ratio by performing the element value adjustment as described above, also with other types of filter circuits, e.g., a filter circuit using an operational amplifier, a resistor and a capacitor, a filter circuit using a MOSFET-RC (a MOSFET, a resistor, a capacitor and an operational amplifier), a filter circuit using a switched capacitor circuit, etc.

With the receiver circuits of the first and second embodiments, the element value adjustment of the actual complex filter circuit 40 may be performed at a point in time such as when the product is shipped from the factory or at power-on. Preferably, the element value adjustment is performed intermittently. This realizes a higher image rejection ratio while being capable of following changes in the temperature and the power supply voltage. In other words, the image rejection ratio of the complex filter circuit 40 can be kept high without taking measures in the complex filter circuit 40 against changes in the temperature and the voltage as long as the element value adjustment is performed intermittently. Thus, without taking special measures in the complex filter circuit 40, it is possible to reduce the circuit area and the power consumption.

A wireless communications system for a battery-operated portable device, or the like, often operates intermittently in order to conserve the battery power. When part of whole of the wireless communications system is brought to a power-save mode intermittently, the complex filter circuit 40 does not need to filter the received signal. Utilizing at least a part of the power-save period, it is possible to perform the element value adjustment for reducing the IQ mismatch without influencing normal signal processing operations of the system. Needless to say, the element value adjustment does not have to be performed in each power-save period, and it can be performed as necessary. Since the primary causes of problems are the changes in the power supply voltage due to changes in the remaining battery power and the changes in the ambient temperature, the element value adjustment can be performed only when there is a significant change in these factors, thereby reducing the amount of power required for the element value adjustment. A detection circuit may be used for detecting changes in the power supply voltage and the temperature. Alternatively, the element value adjustment may simply be performed periodically.

Third Embodiment

In view of the entire receiver circuit, the cause of an IQ mismatch lies not only in the complex filter circuit, and it can be said that any circuit preceding or following the complex filter circuit has an IQ mismatch to some extent. Some circuits may cause not only a gain error but also a phase error. For example, while local oscillator signals LO(I) and LO(Q) produced by a PLL, or the like, are ideally in a quadrature-phase relationship with each other, the phase relationship is somewhat shifted in practice. The shift leads to a shift in the phase relationship between the quadrature-demodulated I and Q signals. A mismatch between mixers in the quadrature demodulator is also a cause of a phase error. It is difficult to remove a phase error only with a complex filter circuit. Therefore, if there occurs a phase error as described above, it is difficult with the receiver circuits of the embodiments described above to sufficiently reduce the IQ mismatch.

Figure 10:
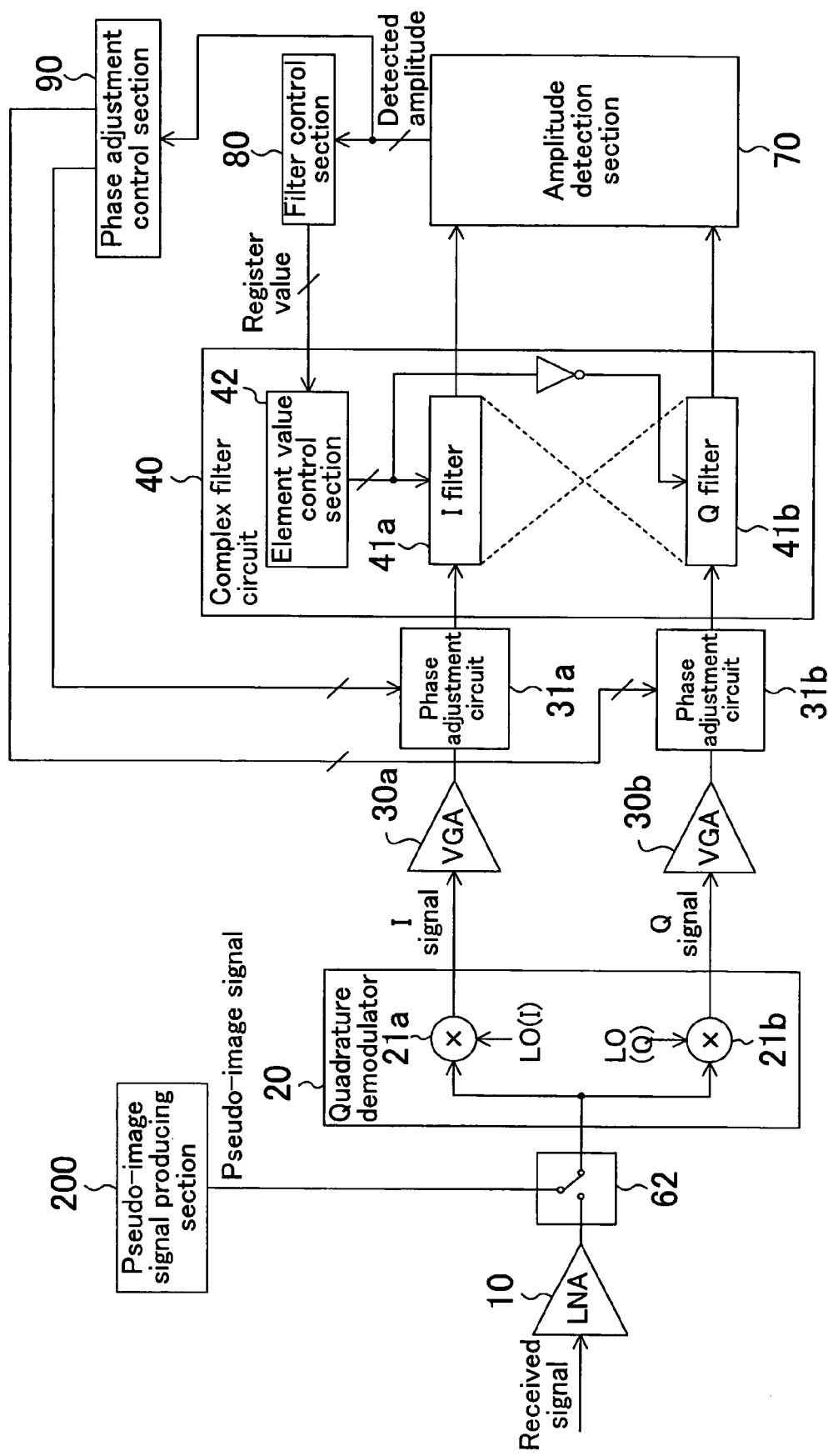
FIG. 10 shows a configuration of a receiver circuit according to a third embodiment of the present invention.

In view of this, a receiver circuit according to a third embodiment of the present invention is capable of correcting not only a gain error but also a phase error. FIG. 10 shows a configuration of the receiver circuit of the third embodiment. The receiver circuit of the present embodiment is obtained by adding phase adjustment circuits 31a and 31b and a phase adjustment control section 90 to the receiver circuit of the second embodiment (FIG. 8). Other components are similar to those of the receiver circuit of the second embodiment. Therefore, those components and the operation of adjusting the element values of elements in the complex filter circuit 40 will not be further described below.

The I-signal-side phase adjustment circuit 31a and the Q-signal-side phase adjustment circuit 31b each make a change to the phase of the received signal. A phase difference can be introduced between the I signal and the Q signal according to the difference between the phase change made by the phase adjustment circuit 31a and that made by the phase adjustment circuit 31b.

The complex filter circuit 40 is normally used as a bandpass filter for extracting an intended signal band. The phase adjustment circuits 31a and 31b may each be a low-pass filter having a sufficiently high cutoff frequency or a high-pass filter having a sufficiently low cutoff frequency.

Figure 11A:
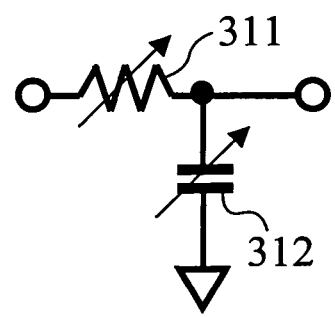
FIG. 11A and FIG. 11B each show a circuit configuration of a phase adjustment circuit as a first-order low-pass filter.
Figure 11B:
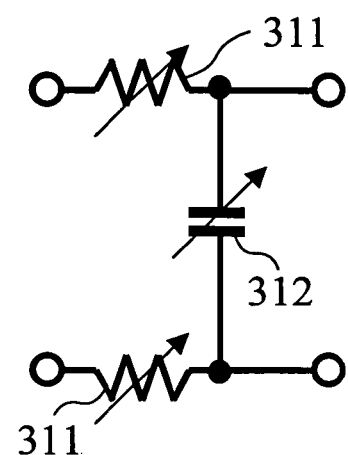

FIG. 11A and FIG. 11B show circuit configurations of the phase adjustment circuits 31a and 31b as first-order low-pass filters. FIG. 11A shows a single-input low-pass filter. This low-pass filter includes a resistor 311 and a capacitor 312. FIG. 11B shows a differential-input low-pass filter. This low-pass filter includes two resistors 311 for the positive and negative input terminals, and a capacitor 312 inserted therebetween. The cutoff frequency can be changed if at least one of the resistor(s) 311 and the capacitor 312 of the low-pass filter is variable. Then, it is possible to change the signal phase. Note that in FIG. 11A and FIG. 11B, the resistor(s) 311 and the capacitor 312 are both variable.

The phase adjustment circuits 31a and 31b used as low-pass filters are not only capable of phase adjustment but are also capable of removing jamming waves present in a high frequency range before they reach the complex filter circuit 40. This suppresses degradation of the dynamic range of the complex filter circuit 40 and improves the jamming wave rejection performance.

Note that excessively low cutoff frequencies result in a decreased gain in the intended signal band, and excessively high cutoff frequencies result in substantially no phase difference occurring even when the cutoff frequency is changed. Preferably, the cutoff frequency is a frequency about ten times as high as the intended signal band.

Figure 12A:
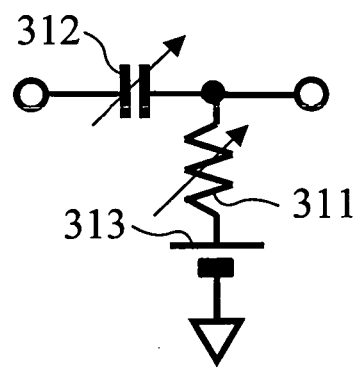
FIG. 12A and FIG. 12B each show a circuit configuration of a phase adjustment circuit as a first-order high-pass filter.
Figure 12B:
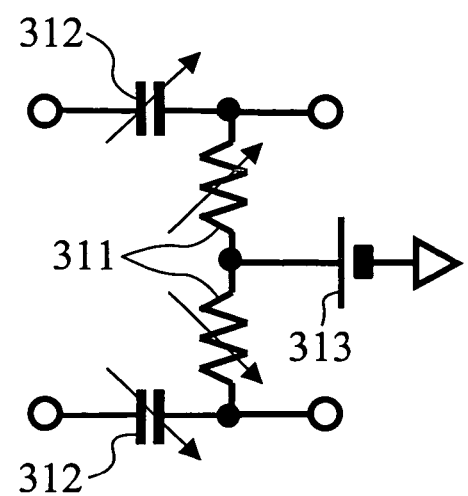

FIG. 12A and FIG. 12B show circuit configurations of the phase adjustment circuits 31a and 31b as first-order high-pass filters. FIG. 12A shows a single-input high-pass filter. This high-pass filter includes a resistor 311, a capacitor 312 and a DC bias source 313. Since DC components are cut off by a high-pass filter, it is necessary to newly apply an appropriate DC bias voltage to the subsequent complex filter circuit 40. The DC bias source 313 is provided at one end of the resistor 311 for this purpose. FIG. 12B shows a differential-input high-pass filter. This high-pass filter includes two resistors 311 and two capacitors 312 for the positive and negative input terminals, and a DC bias source 313 connected between the resistors 311. The cutoff frequency can be changed if at least one of the resistor(s) 311 and the capacitor(s) 312 of the high-pass filter is variable. Then, it is possible to change the signal phase. Note that in FIG. 12A and FIG. 12B, the resistor(s) 311 and the capacitor(s) 312 are both variable.

The phase adjustment circuits 31a and 31b used as high-pass filters are not only capable of phase adjustment but are also capable of removing DC offset components from the signal input to the complex filter circuit 40. DC offset components are superimposed on the signal output from the quadrature demodulator 20, and this is a cause for degradation of the dynamic range of the complex filter circuit 40. In view of this, a high-pass filter may be provided preceding the complex filter circuit 40, thereby reducing the DC offset components and the distortion of the complex filter circuit 40.

Note that excessively high cutoff frequencies result in a decreased gain in the intended signal band, and excessively low cutoff frequencies result in substantially no phase difference occurring even when the cutoff frequency is changed. Preferably, the cutoff frequency is a frequency about 1/10 of the intended signal band.

Alternatively, a low-pass filter and a high-pass filter may be used in combination as the phase adjustment circuits 31a and 31b.

A method for adjusting the phases of the I and Q signals by the phase adjustment circuits 31a and 31b will now be described. In order to change the phase difference between the I and Q signals, the cutoff frequencies of the phase adjustment circuits 31a and 31b being used as high-pass filters or low-pass filters in opposite directions. Specifically, when the cutoff frequency of the phase adjustment circuit 31a is increased (or decreased), the cutoff frequency of the phase adjustment circuit 31b can be decreased (or increased) so that the phases of the I and Q signals are brought closer to (or away from) each other.

However, with actual low-pass filters and high-pass filters, when the phase is changed, the amplitude will also change, which is the cause of an amplitude error. In order to minimize the amplitude error, a low-pass filter preferably has as high a cutoff frequency as possible, and a high-pass filter preferably has as low a cutoff frequency as possible. Specifically, when low-pass filters are used, one of the phase adjustment circuits 31a and 31b can be fixed to the highest oscillation frequency, and when high-pass filters are used, one of the phase adjustment circuits 31a and 31b can be fixed to the lowest oscillation frequency.

Figure 13:
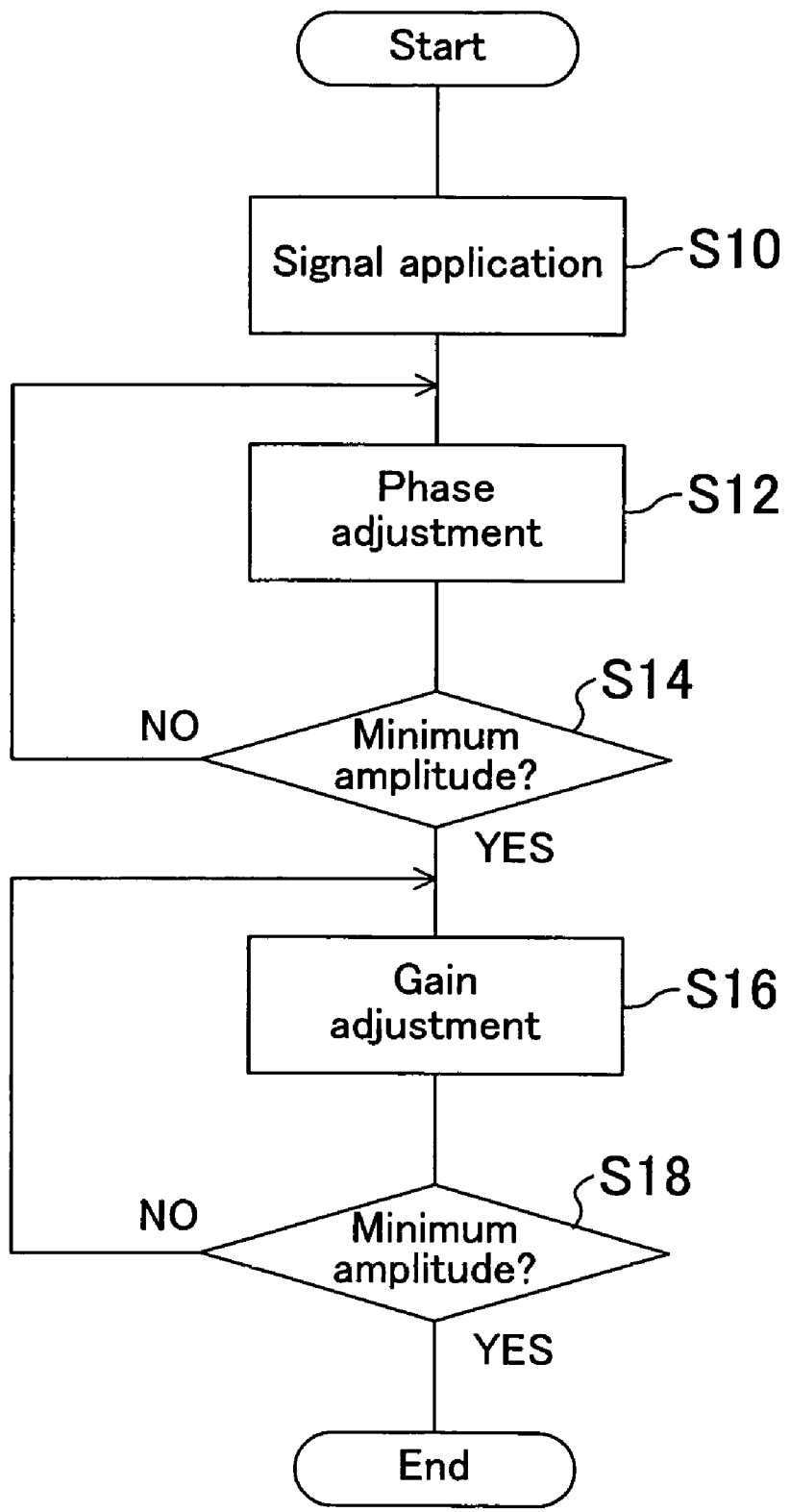
FIG. 13 is a flow chart showing the procedure of an IQ mismatch adjustment method of the receiver circuit shown in FIG. 10.

A method for adjusting the IQ mismatch of the receiver circuit according to the present embodiment will now be described with reference to the flow chart shown in FIG. 13. The receiver circuit of the present embodiment corrects the overall IQ mismatch of the entire circuit by a 2-step adjustment process, including the gain adjustment by the complex filter circuit 40, and the phase adjustment by the phase adjustment circuits 31a and 31b.

First, a signal, e.g., a pseudo-image signal, is applied to the receiver circuit (S10). At this point, there are both a phase error and an amplitude error.

Then, the phase adjustment circuits 31a and 31b are controlled to adjust the phase of the applied signal (S12). The phase adjustment is continued until the amplitude detected by the amplitude detection section 70 reaches the minimum value (S14). At the point where the amplitude reaches the minimum value in step S14, the phase error has been corrected, and there is only the amplitude error.

After the phase error is corrected, the complex filter circuit 40 is controlled to adjust the gain (S16). The gain adjustment is continued until the amplitude detected by the amplitude detection section 70 reaches the minimum value (S18). At the point where the amplitude reaches the minimum value in step S18, the remaining amplitude error has been corrected. Thus, the IQ mismatch adjustment is completed.

An important point of the operation flow described above is that the phase adjustment is performed before the gain adjustment. The phase adjustment is performed before the gain adjustment because the phase adjustment not only changes the phase but also slightly changes the amplitude, whereas the gain adjustment performed by changing the transconductance and the capacitance value of the complex filter circuit 40 does not substantially shift the phase. In other words, since the gain adjustment is always necessary after the phase adjustment, it is preferred to perform the phase adjustment before the gain adjustment.

If the optimal solution is not obtained by one iteration of the process described above, the process may be performed for a plurality of iterations. Alternatively, the phase adjustment may be performed after the gain adjustment. In such a case, however, the gain adjustment is preferably performed again after the phase adjustment.

In the gain adjustment and the phase adjustment, the element values of elements in the complex filter circuit 40 and the phase adjustment circuits 31a and 31b may be obtained by any of a linear search, a binary search and a brute-force search. The search algorithm is not limited to any particular algorithm as long as the optimal solution can be obtained with little error within a short period of time. Thus, any search algorithm may be employed without detracting from the advantageous effects of the present invention.

As described above, according to the present embodiment, both the phase error and the gain error of the I and Q signals are corrected, whereby it is possible to obtain a desirable image rejection ratio for the receiver circuit as a whole.

The signal applied in step S10 may be an actual signal. Where the IQ mismatch adjustment is performed based on an actual signal, the pseudo-image signal producing section 200 may be omitted. The actual signal includes any frequency component such as the intended signal and the image signal. However, it is near the image frequency where the gain significantly changes when the transconductance and the capacitance value are changed in the complex filter circuit 40, and the gain does not substantially change in other frequency ranges. Therefore, it can be said that most of the signal amplitude detected by the amplitude detection section 70 is that of the image signal. Thus, the image rejection ratio of the receiver circuit can be improved by the process described above performed with an actual signal, instead of a pseudo-image signal, being applied to the receiver circuit.

Note that in a case where an actual signal is applied, it is preferred that the resolution of the amplitude detection section 70 is sufficiently high. If the amplitude of the actual signal changes over time, an amplitude error will occur. Therefore, it is preferred that the amplitude detection is performed within as short a period of time as possible. Moreover, it is preferred that the amplitude detection is performed a plurality of times with the same phase adjustment settings and the same gain adjustment settings, wherein the IQ mismatch adjustment is performed when the detected value is stable.

What is claimed is:

1. A quadrature-modulated signal receiver circuit, comprising:
   a quadrature demodulator for quadrature-demodulating a received signal;
   a complex filter circuit comprising first and second filter circuits receiving first and second signals, respectively, which are in a quadrature-phase relationship with each other, wherein:
   each of the first and second filter circuits includes at least one variable element whose element value is variable;
   the complex filter circuit comprises an element value control section for changing the element value of a variable element in the first filter circuit and the element value of a corresponding variable element in the second filter circuit so that absolute values of the element values of the variable elements increase/decrease in opposite directions;
   a signal switch for selectively inputting to the receiver circuit one of an actual signal and a pseudo-image signal imitating an image signal contained in the actual signal;
   an amplitude detection section for detecting an amplitude of a signal having passed through the complex filter circuit; and
   a filter control section for controlling the element value control section in the complex filter circuit based on the amplitude detected by the amplitude detection section,
   wherein the filter control section controls the element value control section with the pseudo-image signal being input to the receiver circuit via the signal switch so as to decrease the amplitude detected by the amplitude detection section.

2. The receiver circuit of claim 1, further comprising a pseudo-image signal producing section for producing the pseudo-image signal.

3. The receiver circuit of claim 2, wherein:
   the pseudo-image signal producing section includes first and second selector circuits for producing first and second signals, which are in a quadrature-phase relationship with each other, each as the pseudo-image signal;
   the first selector circuit receives first and second voltages corresponding respectively to logical levels Hi and Low of the pseudo-image signal, and outputs the first or second voltage as the first signal by toggling between the first and second voltages for every two periods of a control clock signal having a frequency four times as high as that of the pseudo-image signal; and
   the second selector circuit receives the first and second voltages, and outputs the first or second voltage as the second signal by toggling between the first and second voltages for every two periods of the control clock signal so that the second signal is shifted from the first signal by one period of the control clock signal.

4. The receiver circuit of claim 2, wherein the pseudo-image signal producing section includes a mixer for mixing a signal corresponding to a quadrature-demodulated image signal with a local oscillator signal having a predetermined frequency to output an output of the mixer as the pseudo-image signal.

5. The receiver circuit of claim 4, wherein the frequency of the local oscillator signal input to the mixer is equal to that of a local oscillator signal input to the quadrature demodulator.

6. The receiver circuit of claim 4, wherein the frequency of the local oscillator signal input to the mixer is equal to a frequency shifted from the frequency of the local oscillator signal input to the quadrature demodulator by a frequency that is twice a frequency of the quadrature-demodulated image signal.

7. The receiver circuit of claim 1, wherein the amplitude detection section includes:
   an A/D conversion section for digitally converting an input signal;
   a bandpass filter section for extracting a digital value of a predetermined frequency band from an output from the A/D conversion section; and
   a calculation section for performing an operation on the digital value extracted by the bandpass filter section to obtain the amplitude.

8. The receiver circuit of claim 1, wherein the filter control section controls the element value control section intermittently.

9. The receiver circuit of claim 1, wherein:
   the signal switch selectively inputs one of the actual signal and the pseudo-image signal to the quadrature demodulator;
   the receiver circuit includes:
   first and second phase adjustment circuits for adjusting phases of first and second signals output from the quadrature demodulator, which are in a quadrature-phase relationship with each other; and a phase adjustment control section for controlling the first and second phase adjustment circuits based on the amplitude detected by the amplitude detection section; and the phase adjustment control section controls the first and second phase adjustment circuits with the pseudo-image signal being input to the quadrature demodulator via the signal switch so as to decrease the amplitude detected by the amplitude detection section.

10. The receiver circuit of claim 9, wherein the phase adjustment control section controls the first and second phase adjustment circuits so that phases of the first and second signals are brought closer to or away from each other.

11. The receiver circuit of claim 9, wherein:
each of the first and second phase adjustment circuits is a low-pass filter including a resistor and a capacitor; and
at least one of the resistor and the capacitor is a variable element whose element value can be varied by a control of the phase adjustment control section.

12. The receiver circuit of claim 9, wherein:
each of the first and second phase adjustment circuits is a high-pass filter including a resistor, a capacitor, and a DC bias source connected to one end of the resistor; and
at least one of the resistor and the capacitor is a variable element whose element value can be varied by a control of the phase adjustment control section.

13. The receiver circuit of claim 9, wherein the first and second phase adjustment circuits are controlled by the phase adjustment control section, after which the element value control section in the complex filter circuit is controlled by the filter control section.

14. A quadrature-modulated signal receiver circuit, comprising:
a quadrature demodulator for quadrature-demodulating a received signal;
first and second phase adjustment circuits for adjusting phases of first and second signals output from the quadrature demodulator, which are in a quadrature-phase relationship with each other;
a complex filter circuit comprising first and second filter circuits receiving the first and second signals, respectively, which are in a quadrature-phase relationship with each other, wherein:
each of the first and second filter circuits includes at least one variable element whose element value is variable;
the complex filter circuit comprises an element value control section for changing the element value of a variable element in the first filter circuit and the element value of a corresponding variable element in the second filter circuit so that absolute values of the element values of the variable elements increase/decrease in opposite directions;
an amplitude detection section for detecting an amplitude of a signal having passed through the complex filter circuit;
a filter control section for controlling the element value control section in the complex filter circuit based on the amplitude detected by the amplitude detection section; and
a phase adjustment control section for controlling the first and second phase adjustment circuits based on the amplitude detected by the amplitude detection section, wherein:
the filter control section controls the element value control section so as to decrease the amplitude detected by the amplitude detection section; and
the phase adjustment control section controls the first and second phase adjustment circuits so as to decrease the amplitude detected by the amplitude detection section.

15. The receiver circuit of claim 14, wherein the phase adjustment control section controls the first and second phase adjustment circuits so that phases of the first and second signals are brought closer to or away from each other.

16. The receiver circuit of claim 14, wherein:
each of the first and second phase adjustment circuits is a low-pass filter including a resistor and a capacitor; and
at least one of the resistor and the capacitor is a variable element whose element value can be varied by a control of the phase adjustment control section.

17. The receiver circuit of claim 14, wherein:
each of the first and second phase adjustment circuits is a high-pass filter including a resistor, a capacitor, and a DC bias source connected to one end of the resistor; and
at least one of the resistor and the capacitor is a variable element whose element value can be varied by a control of the phase adjustment control section.

18. The receiver circuit of claim 14, wherein the first and second phase adjustment circuits are controlled by the phase adjustment control section, after which the element value control section in the complex filter circuit is controlled by the filter control section.

* * * * *